United States Patent [19]

Shuff

[11] Patent Number: 5,758,165

[45] Date of Patent: *May 26, 1998

[54] LOCAL AREA NETWORK AND NETWORK OPERATING SYSTEM FOR FORMATTING A CLIENT DISK AND INSTALLING A CLIENT OPERATING SYSTEM

[75] Inventor: Patrick R. Shuff, Houston, Tex.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 499,228

[22] Filed: Jul. 7, 1995

[51] Int. Cl.⁶ ........................................... G06F 9/445
[52] U.S. Cl. ........................................ 395/712; 395/652
[58] Field of Search ................................. 395/652, 712

[56] References Cited

U.S. PATENT DOCUMENTS

| | | | |
|---|---|---|---|
| 5,142,680 | 8/1992 | Ottman et al. | 395/712 |
| 5,280,627 | 1/1994 | Flaherty et al. | 395/652 |
| 5,349,673 | 9/1994 | Yasuda | 395/652 |
| 5,361,358 | 11/1994 | Cox et al. | 395/652 |
| 5,404,527 | 4/1995 | Irwin et al. | 395/652 |
| 5,418,918 | 5/1995 | Vander Kamp et al. | 395/652 |
| 5,452,454 | 9/1995 | Basu | 395/652 |

*Primary Examiner*—Emanuel Todd Voeltz
*Assistant Examiner*—John Q. Chavis
*Attorney, Agent, or Firm*—Blakely Sokoloff Taylor & Zafman

[57] ABSTRACT

Unattended initialization of client disks according to foreign operating systems is supported. The data written on the client disk is provided from a server disk across a local area network (LAN), rather than from floppy disks. The client system is booked over the LAN with a first, network-oriented operating system, such as the UNIX-based Solaris™ operating system developed by Sun Microsystems, Inc. Solaris™ is then used to format the client disk. This formatting is done according to the file access table (FAT) file system. Then Solaris™ copies a disk image to the client disk from the server disk via the LAN. The disk image copied includes a second, client-oriented operating system, such as Windows™ that uses the FAT file system. Then the client system is rebooted with Windows™. Network services, such as naming services or remote file access, can then be provided to Windows™ running on the client by Solaris™ running on the server.

6 Claims, 3 Drawing Sheets

LOCAL AREA NETWORK AND NETWORK OPERATING SYSTEM FOR FORMATTING A CLIENT DISK AND INSTALLING A CLIENT OPERATING SYSTEM

FIELD OF THE INVENTION

The present invention relates generally to methods and apparatus for initializing a disk on a computer system attached to a local area network. In particular, it relates to using the local area network and a first network-oriented operating system to initialize such a disk and install thereon a second client-oriented operating system.

BACKGROUND OF THE INVENTION

Many home PCs are purchased with an attached hard disk drive that is already formatted, that already has installed thereon DOS or Windows™, and that already has installed thereon several applications programs, such as a word processor, a spreadsheet or a network access program. Most business PCs, when first turned over to the business end user, also come with an attached, formatted hard disk with a similar suite of pre-installed software.

In both of these cases, a trained technician, probably not the end user, has initialized the disk. That is, a trained person takes a hard disk and (i) formats the disk;
(ii) copies onto the disk the boot record and the hidden and regular files that the operating system to be run on the PC requires on its boot disk (e.g. for MS-DOS™, the files named IO.SYS, MSDOS.SYS, and COMMAND.COM are the absolute minimum requirements);
(iii) copies onto the disk any networking software to be used;
(iv) reboots the system; and
(v) installs onto the disk the applications programs.

Installing software onto a hard disk is often performed by means of an installation script or program. Installation scripts may interact with the person executing them to allow optional installation of some features: For example, character fonts that are less often used may be installed only if the user answers "yes" to the appropriate on-screen prompt. Installation scripts may also interact with the user to learn the system configuration: for example, the software being installed may need to know what type of audio reproduction hardware is available on this system.

Whether or not interactive installation scripts or programs are used, the installation process spends the majority of its time copying files onto the hard disk. Typically the files a PC operating system or program requires are obtained from floppy disks, which have relatively slow data transfer rates and relatively small data storage capacity. It is not unusual for the installation process to require the user to change floppy disks—after the files contained on each floppy are copied to the hard disk, it must be manually removed and another floppy inserted.

Installing a DOS operating system requires an installation process involving three floppies and perhaps ten minutes. Installing networking software may require perhaps eight floppy disks inserted over a twenty-minute period. A reasonably sized application program may require the same. Windows NT™ takes the place of both DOS and the networking software. It requires reading approximately twenty floppy disks. In total, initializing a PC disk, i.e. formatting it and installing an operating system, networking software and several applications programs, may require one to two hours, or more.

Thus, there is a need to speed up the PC disk initialization process, particularly by avoiding changing floppy disks and interacting with the user.

PCs can be considered to have client-oriented operating systems in that PCs started as stand alone computers, which subsequently evolved into computers interconnected via a local area network (LAN). In contrast, engineering workstations can be considered to have network-oriented operating systems in that engineering workstations started as multicomputer networks.

Early engineering workstation networks often included client computer systems without a local hard disk. Thus they had to boot over the network. That is, their network-oriented operating system and their hardware LAN interface had to be capable of running the operating system after portions of it are loaded into main memory via the LAN from the disk of a server computer system.

In this engineering workstation environment, it is both feasible and desirable to automate the process of installing the network-oriented operating system from a server disk onto a client disk via a LAN. (See, for example, *Automating Solaris Installations*, pp. 1–22).

Thus there is a need to use a first, network-oriented operating system to initialize client disks that contain and are to be used with a second, client-oriented operating system.

SUMMARY OF THE INVENTION

Unattended initialization of client disks according to foreign operating systems is supported. The data written on the client disk is provided from a server disk across a LAN, rather than from floppy disks.

First, the client system is booted over the LAN with a first, network-oriented operating system. The network-oriented operating system executes on the client to format the client disk. This formatting is done according to a second, client-oriented operating system.

Windows™ is one preferred choice for the client-oriented operating system, due to its popularity and the range of applications software written for that environment. The UNIX-based Solaris™ operating system developed by Sun Microsystems, Inc. is one preferred choice for the network-oriented operating system because of its ability to be booted over a LAN, to format disks according to the file access table (FAT) file system commonly used on PCs, and to write FAT files.

The operating systems that are prevalent today for personal computers (PCs) are based on the FAT file system. The FAT file system was originated by Microsoft Corporation's well known Microsoft—Disk Operating System (MS-DOS™) operating system. Today, there are several additional operating systems based on the FAT file system, including DOS-compatible operating systems from other vendors, Microsoft's Windows™, Windows for Workgroups™ and Windows-NT™ operating systems.

Next the network-oriented operating system executes on both the client and the server to copy a disk image to the client disk from the server disk via the local area network (LAN). The disk image is written on the server disk according to the client-oriented operating system. The disk image copied includes all files required to execute the client-oriented operating system as well as all files required for any networking software and for any applications programs that are to reside on the client disk.

Next the client system is rebooted with the client-oriented operating system off its local client disk. Network services, such as naming services or remote file access, can then be provided to the client-oriented operating system running on the client by the network-oriented operating system, which continues to run on the server.

DETAILED DESCRIPTION OF THE INVENTION

Figure 1:
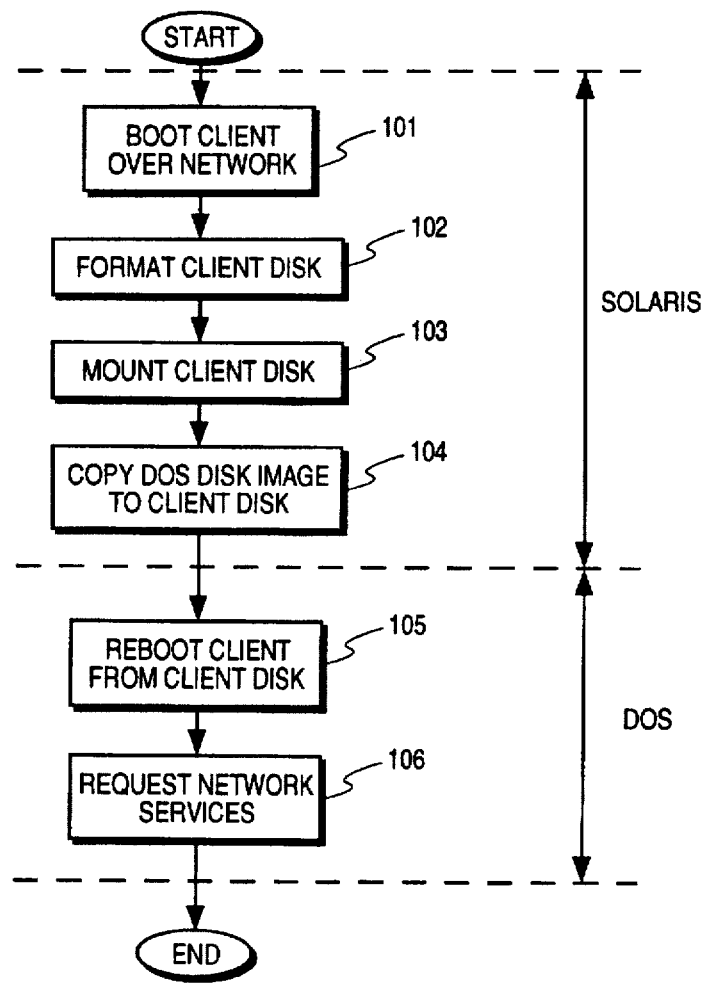
FIG. 1 shows the steps involved in practicing the present invention and which operating system performs those steps on the client computer system.

FIG. 1 is a flow chart of the process of initializing a disk attached to a client computer system according to the present invention. FIG. 1 also indicates which operating system executing on the client performs each step in the process: i.e. Solaris, a preferred network-oriented operating system, or DOS, a preferred client-oriented operating system.

In step 101, the client system is booted over the LAN with Solaris™. PCs based on the processors developed by Intel Corporation typically have a power-on or reset start up sequence. This sequence is contained within the basic input output system (BIOS) firmware located in a read only memory (ROM) within the client system. Typically this sequence first looks at the client system's floppy disk drive. If a disk is present, then the BIOS boots the client system from that floppy disk. Next, if a hard disk is present, then the BIOS boots the client system from that disk. The method of the present invention requires indicating to the BIOS that no hard disk is present in the client computer system.

Next, the BIOS attempts to boot the client system off any attached LAN. In step 101, this attempt to boot over the LAN is successful and the client computer system starts operating under the control of the version of the Solaris™ operating system that runs on Intel-based PCs. Portions of this operating system are written into the main memory of the client system and portions are available to be read in over the LAN as needed. This operating system resides on a disk attached to a server, which in turn is attached to the LAN. The version of Solaris™ controlling the server recognizes the client system's boot message broadcast over the LAN and responds by making the PC version of Solaris™ available to the client system over the LAN.

The user interaction required to perform step 101 can be as little as turning on the power of the client system. Additionally, the user must ensure that there is no floppy disk in the drive and that the hard disk attached to the client system will not be recognized as being present at boot time by the BIOS. The user interaction required to perform step 102 can be as little as typing one command at the Solaris™ prompt. That command would invoke a script that contains the sequence of commands required to perform steps 101 to 105. At this point, the user interaction required by the method of the present invention is complete. The remaining processes occur automatically, unless exceptional circumstances prevent normal completion of a step of the process.

A typical example of a disk initialization script according to the present invention is given in Table 1:

TABLE 1

| Step 102: | fdisk /dev/dsk/c0t0d0 |
| Step 103: | mount −Fpcfs /dev/dks/c0t0d0 /pcfs |
| Step 104: | dd if=/net/server/dodimage of=/pcfs |
| Step 105: | init 6 |

In step 102, Solaris™ executes on the client to format the client disk. This formatting is done according to the file system used by the client-oriented operating system, which preferably is the FAT file system. Unlike many network-oriented operating systems, Solaris™ is able to format a disk using a foreign format.

In step 103, Solaris™ executes on the client to mount the client disk. Mounting is a command or process within Solaris™ that makes available a specified region of a disk drive (in this case /dev/dsk/c0t0d0) under a specified name (in this case /pcfs). The copy operation of step 104 would fail if this mount step were skipped.

In step 104, Solaris™ executes on both the client and the server to copy a disk image to the client disk from the server disk via the LAN. The disk image is written on the server disk according to the FAT file system. The disk image copied includes all files required to execute DOS, as well as all files required for any networking software and for any applications programs that are to reside on the client disk. Unlike many network-oriented operating systems, Solaris™ is able to write disk files in a foreign format.

At the completion of step 104, the client disk is initialized.

In step 105, the client system is rebooted with DOS off its local client disk. This terminates the execution of Solaris™ on the client.

In step 106, network services, such as naming services or remote file services, are provided as requested by DOS running on the client by Solaris™, which continues to run on the server.

Naming services can be critical in networked computer systems. They answer questions such as: "Who are the authorized users?" and "What computer systems are on this LAN?"

Remote file services allow software that resides on the server's disk to execute on the client as if it were on the client's local disk. Remote file services also allow software executing on the client to access data files that reside on the server's disk as if they were on the client's local disk.

Figure 2:
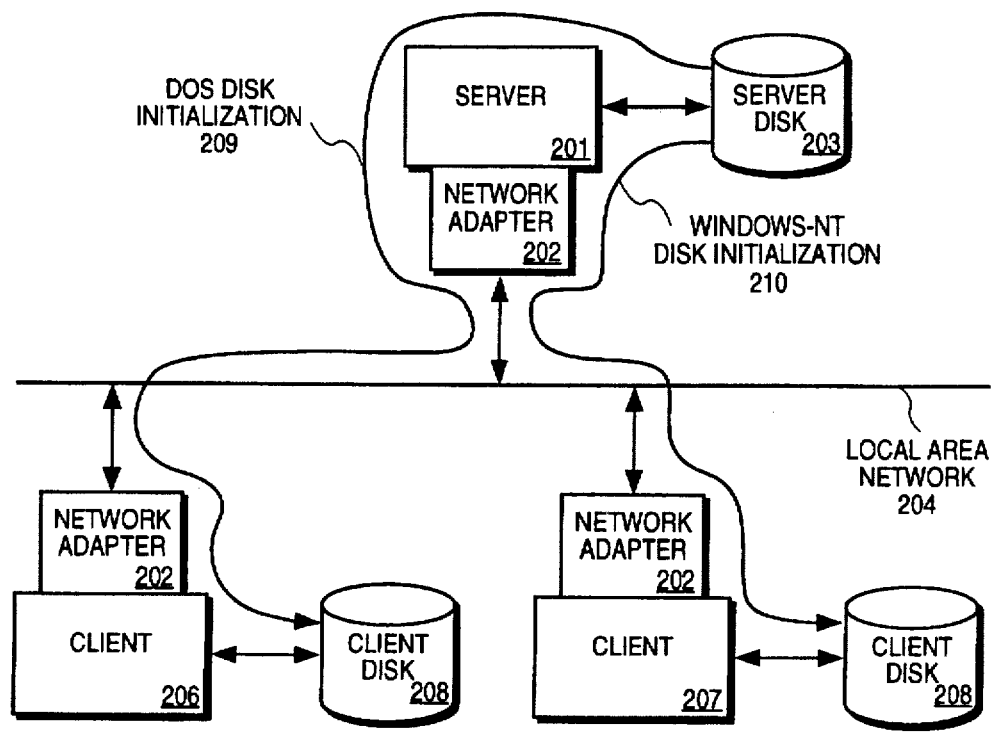
FIG. 2 shows one preferred embodiment of a networked computer system on which the present invention can be practiced.
Figure 3:
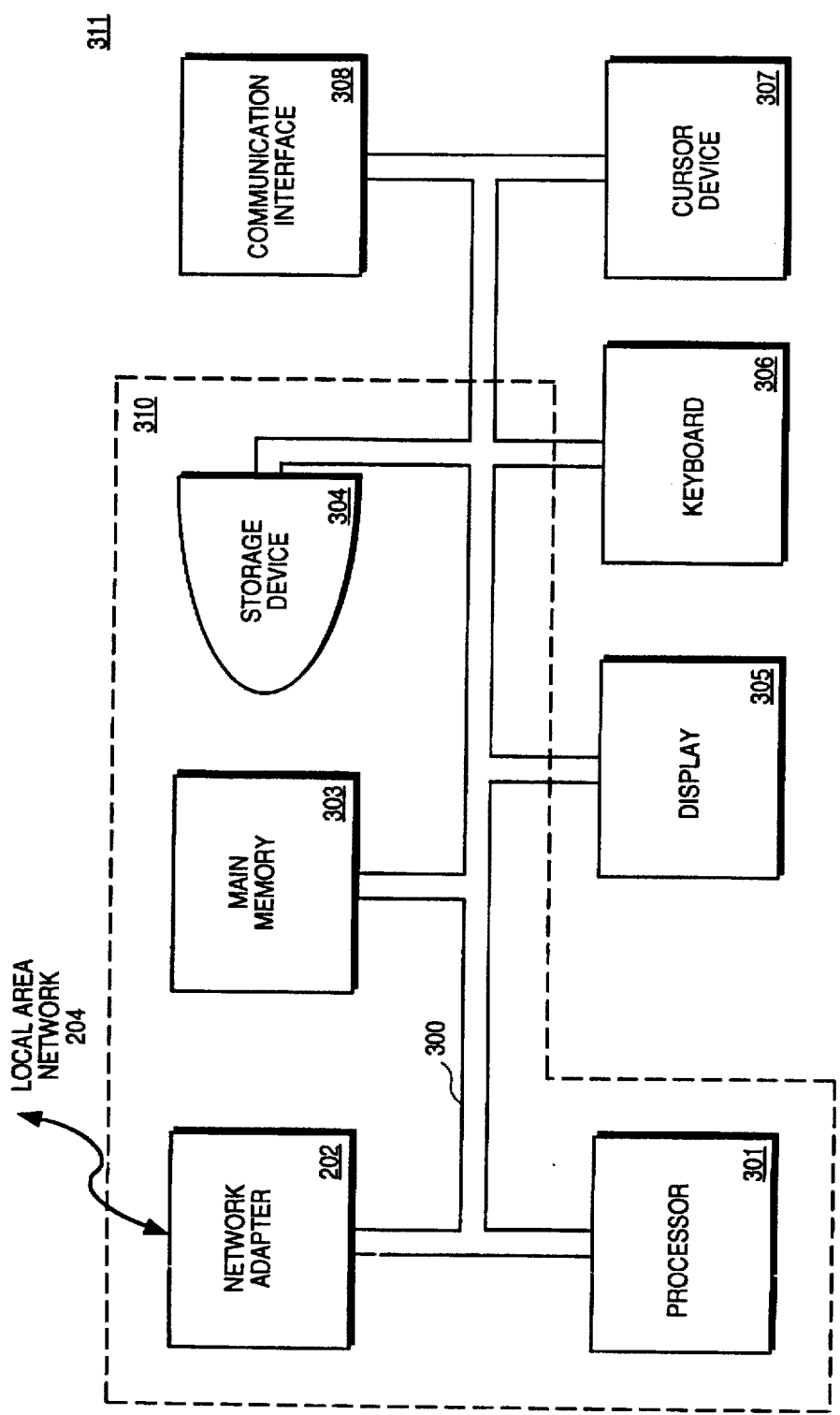
FIG. 3 shows one preferred embodiment of the network (LAN) used to implement the present invention.

FIG. 2 is a network architecture diagram of a computer system on which the present invention can be performed. It also shows DOS disk initialization 209, in which client disk 208 attached to client 206 is initialized with DOS. It also shows Windows-NT disk initialization 210, in which client disk 208 attached to client 207 is initialized with Windows-NT™.

Local area network (LAN) 204 interconnects server 201, client 206 and client 207, via network adapters 202. Preferably LAN 204 is a Ethernet. Network adapters 202 must support remote booting of clients 206 and 207 over LAN 204—that is, the operating system that comes up during the boot process must be able to be provided from LAN 204 via network adapters 202.

Server disk 203 contains the disk images which are to be copied onto client disks 208. A different disk image is required for each different configuration that is to be written onto client disk 208.

For example, there could be a first disk image of a basic PC system intended to execute a word processing application in a networked DOS environment. Such a disk image might contain only DOS, the networking software chosen and the word processor chosen. A second disk image could be intended for a software developer operating under Windows-NT™. Such a disk might contain Windows-NT™, compilers, linkers, debuggers, revision control programs, flowcharting programs, run time libraries, source code libraries, benchmark programs, suites of test data, and so on.

Each such disk image is initially generated as follows: A prototype client system is initialized according to prior art methods. Once the selected operating system(s), application(s) and data file(s) are on the client disk, then it is copied over LAN 204 onto server disk 203

It will be obvious to one skilled in the art that schemes could be employed to reuse portions of disk image files in initializing client disks 208 without departing from the sprit of scope of the present invention. Likewise, empty portions of client disks 208 could be algorithmically generated rather than copied. If there are a large number of configurations of large client disks, then such optimizations may be significant.

The preferred embodiment of the present invention and various alternative embodiments and designs are disclosed herein. Nevertheless, various changes in form and detail may be made while practicing the invention without departing from its spirit and scope or from the following claims. For example, the network-oriented operating system could be any that is capable of being booted on the client system and that is capable of disk formatting and writing operations according to the client-oriented operating system. Also, the file system could be any that is used by the client-oriented operating system and according to which the network-oriented operating system is able to format and write files. Also, the client operating system could be any according to which the network-oriented operating system can format and write disks.

I claim:

1. A method of initializing a disk coupled to a client from a first operating system controlling a server, comprising the steps of:

responding to said client coupled to said server via a local area network by making a version of said first operating system adaptable to a second operating system of said client;

booting said client with said version of said first operating system, said booting comprising copying portions of said version of said first operating system from said server to a main memory within said client;

executing said version of said first operating system from said main memory so as to format said disk, said formatting being in accordance with said second operating system;

executing said version of said first operating system to mount said disk;

causing said server to write a disk image to a server disk; and executing said version of said first operating system from said main memory so as to copy said disk image from said server disk to said disk coupled to said client.

2. A method according to claim 1, subsequently comprising:

executing said first operating system from said main memory so as to reboot said client, said rebooting occurring with said second operating system from said disk.

3. A method according to claim 2, subsequently comprising:

said second operating system executing on said client calling upon said first operating system executing on said server for network services.

4. A computer program product comprising:

a computer readable medium having computer readable code embodied therein for initializing a disk coupled to a client, said computer program product comprising:

computer readable program code devices configured to respond to said client coupled to a server via a local area network by making a version of a first operating system adaptable to a second operating system of said client;

computer readable program code devices configured to boot said client with said version of said first operating system, said boot comprising copying portions of said version of said first operating system from said server to a main memory within said client;

computer readable program code devices configured to execute said version of said first operating system from said main memory so as to format said disk, said formatting being in accordance with said second operating system, said first operating system further mounting said disk;

computer readable program code devices configured to cause said server to write a disk image to a server disk: and computer readable program code devices configured to execute said version of said first operating system from said main memory so as to copy said disk image from said server to said disk coupled to said client.

5. A computer program product according to claim 4, further comprising:

computer readable program code devices configured to execute said first operating system from said main memory so as to reboot said client, said rebooting occurring with said second operating system from said disk.

6. A computer program product according to claim 4, further comprising:

computer readable program code devices configured so that said second operating system executing on said client calls upon said first operating system executing on said server for network services.

* * * * *